Figures 1, 2, 3, 4:
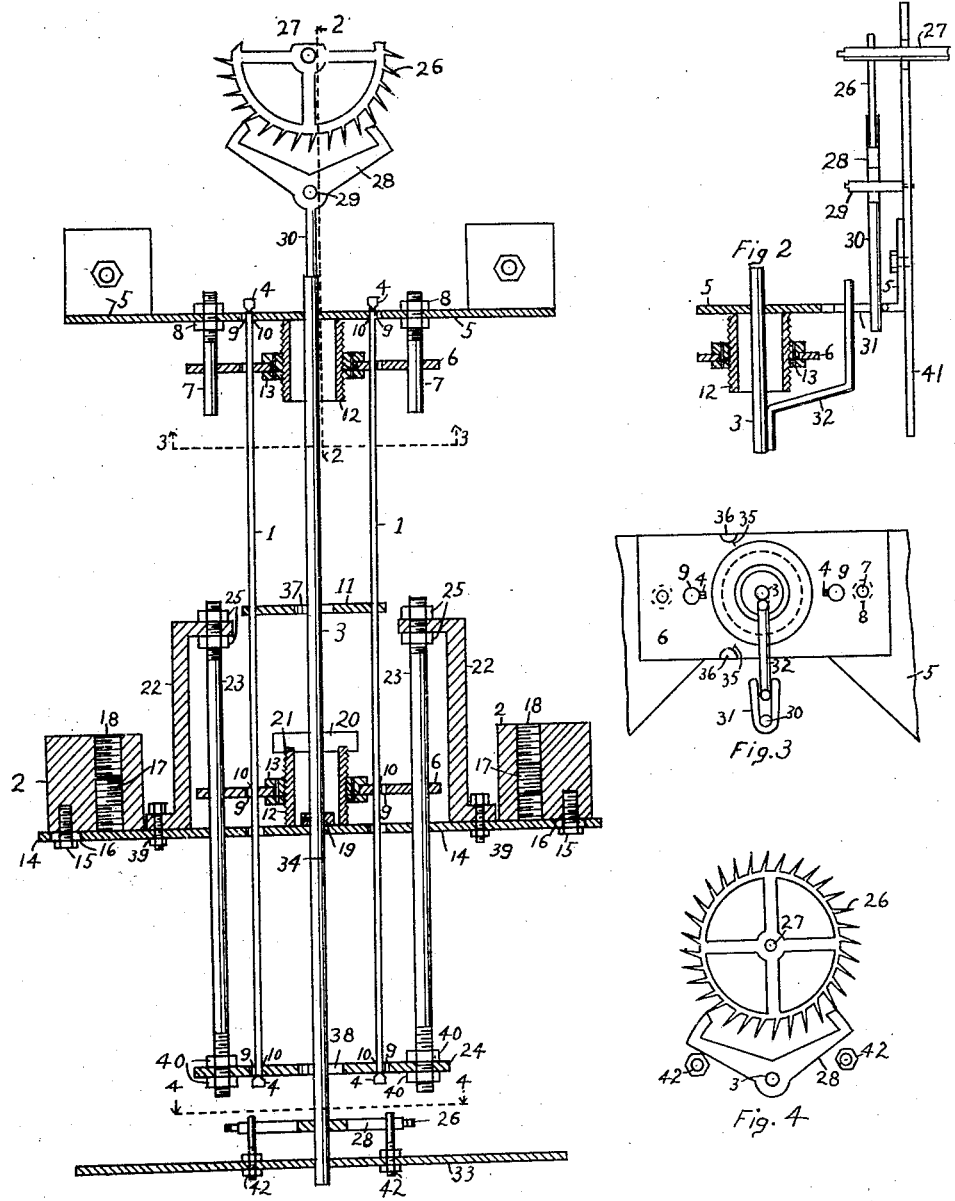

M. F. SANBORN.
OSCILLATING ROTARY PENDULUM.
APPLICATION FILED AUG. 19, 1921.

1,409,242.

Patented Mar. 14, 1922.

Inventor
Morton F. Sanborn

Witnesses

UNITED STATES PATENT OFFICE.

MORTON F. SANBORN, OF PLEASANTVILLE, NEW YORK.

OSCILLATING ROTARY PENDULUM.

1,409,242.     Specification of Letters Patent.    Patented Mar. 14, 1922.

Application filed August 19, 1921. Serial No. 493,634.

*To all whom it may concern:*

Be it known that I, MORTON FRANKLIN SANBORN, a citizen of the United States, residing at Pleasantville, in the county of Westchester and State of New York, have invented a new and useful Oscillating Rotary Pendulum, of which the following is a specification.

My invention relates to a new type of oscillating rotary pendulum to be used in clocks or other instruments for measuring the ordinary pendulum and the lever are used and which consists briefly of a round time and in which the principles of both pendulum weight such as a ring or a series of two or more weights spaced equal distances apart, on the same level, and at an equal distance from a common vertical axis, such weight or weights being suspended by two or more suspension wires spaced equal distances apart and at an equal distance from the common vertical axis of the weights. Motion is received and transmitted to the escapement of a clock by a vertical pendulum staff, having one or more bearings, which is attached to or passes through the pendulum weights on the line of their common axis. Provision is also made for adjustment for isochronism at the weight by a movable slide through which the suspension wires pass. Raising the slide above the elevation of the center of gyration will make the clock go faster with heavier clock weights while lowering the slide will make the clock go slower with an increase of power. Adjustment for rate is provided at the upper end of the suspension wires. Spanners are also provided when necessary to maintain the suspension wires at all times, during the rotation of the pendulum, at an equal distance from the common vertical axis in order that the wires may form as near a true spiral as possible while the pendulum is in motion.

In this pendulum it was found that the rate depended, 1st upon the effective length of the suspension wires and, 2nd upon the ratio of the distance between the suspension wires and the common vertical axis of the whole pendulum weight to the distance between the center of gyration of the weight and its vertical axis.

The beats per minute of the ordinary pendulum are found by the formula—

$$\text{Beats} = \frac{375.66}{\sqrt{L}}$$

The final rate in beats per minute for the oscillating rotary pendulum of my invention is—

$$\frac{375.66}{\sqrt{L}} : \text{Rate} :: W : S$$

or $$\text{Rate} = \frac{375.66 S}{W\sqrt{L}}$$

$\frac{W}{S}$ could be expressed as P, and then the formula becomes $$\text{Rate} = \frac{375.66}{P\sqrt{L}}$$

In which—

S=distance from the vertical axis of the pendulum to the suspension wires.

W=distance from the vertical axis of the pendulum to the center of gyration.

L=effective length of the suspension wires.

$$P = \frac{W}{S}$$

In the above formula the length of an ordinary pendulum to beat seconds at London, 39.1393 inches, was used.

The advantages of this pendulum over the ordinary oscillating pendulum are many and include the following:—

Much less power is required.

A considerable less length of pendulum is required and therefore a smaller clock case may be used.

The clock goes even when considerably tilted.

Great advantage in temperature compensation is found since that part of the rate due to the lever action is one of ratio and with the arm or base, supporting the weight, of the same material, the ratio is always constant.

A slower rate is possible and thus the clock will run considerably longer even with a reduced size of the clock weights.

Ease of adjusting for both rate and isochronism is found, and novelty and ease of standardization in the construction of the pendulum.

The advantages over the oscillating rotary pendulum with the single torsion suspension wire are many and include:—

A definite rate.

Independent of the torsion of the suspension wire and the necessary changes of rate with the change of elasticity of the suspension wire.

A definite action which is transmitted to the escapement through the pendulum staff.

Adjustment for isochronism.

It may be seen from the specifications and from the drawings that my invention may be used in various designs and types as best adapted to the various clock movements and clock cases and some of these variations may briefly be stated as follows:—Two or more suspension wires; one or more weights to form the complete pendulum weight; adjustments for rate by reducing or increasing the length of the suspension wires at or near the top and by moving the weights in or out at the base; adjustments for isochronism are provided for by having a movable slide on the suspension wires near the weight so that the slide is at or near the elevation of the center of gyration of the complete pendulum or by having small weights adjustable as to their height so as to raise or lower the center of gyration; the escape wheel of the clock movement may revolve on either a vertical or a horizontal axis. The pendulum staff may have one or two bearings and the pallet or staff pin which engages with the pallet of the clock may be mounted at any suitable height on the staff; bankings may be provided to prevent an excessive rotation of the pendulum especially when the clock is moved.

Some of these designs are shown in the accompanying drawings, in which—

Figure 1 is a vertical section of a two suspension wire pendulum with the necessary adjustments for rate isochronism and compensation for temperature changes and with the pallet mounted at the bottom of the staff and a staff arm which engages with the fork of a pallet at the top. Only one form of escapement however could be used at a time; Figure 2 is a section taken on line 2—2 showing the staff arm engaging with the fork of a pallet; Figure 3 is a plan taken on line 3—3 of Fig. 1 to show the bridge slide, etc.; and Figure 4 is a plan on line 4—4 of Fig. 1 to show the pallet mounted on the pendulum staff and engaging with an escape wheel which rotates on a vertical axis.

Similar numerals refer to similar parts throughout the several views.

The suspension wires 1, the weight or weights 2, the pendulum staff 3, the bridge 5 and the weight base 14 constitute the main part of the oscillating rotary pendulum.

Clamps 4, are secured to the ends of the suspension wires to give bearings on the upper and lower bridges or on the pendulum base or the slide at weight. Slots 10, hold the wires in their proper position and holes 9, are to pass the wires through. Adjustable slides 6, are to give adjustment for rate and isochronism and the adjustments are made by turning thumb nuts 13 which hold the slides 6, on the thread of the pipe 12. Guide pins 7, and rods 23, pass through holes in the slides and are held to bridge 5, by nuts 8, and to posts 22, by nuts 25. Spanners 11, with holes 37 are provided when necessary to maintain the suspension wires at a uniform distance from the vertical axis of the pendulum.

Bolts 15, pass through the slots 16, in the base and into the weights to provide adjustment to and from the axis and the small threaded weights 17 pass up and down through the holes 18, to give close adjustment for isochronism. A collar 19, with a set screw holds the staff 3, at the proper elevation. Guide 20, soldered or otherwise fastened to the staff 3, enter the slots 21, in the pipe 12, at the weight and prevents the tipping of the weight when only two suspension wires are used in a direction at right angles to a line between the wires and also causes the weight to turn with the staff.

Posts 22, fastened to the base 14, by nuts 39, rods 23, fastened to the posts 22 by nuts 25, and to lower bridge 24, by nuts 40, and suspension wires 1 form the compensation feature of the pendulum, the wires and posts being of steel or other material having a low coefficient of expansion and the rods being of brass or other material having a high coefficient of expansion and the relative lengths of the various parts are determined by the coefficient of expansion of the materials used.

The lower bridge 24, carries the pendulum weight and without the compensation feature it would be eliminated and the pendulum base or lower slide would carry the weight. Hole 38 in the lower bridge is to give the staff room for play without binding.

The escape wheel 26, with its arbor 27 and the pallet 28 is shown at both the top and bottom of the drawing although of course only one of them could be used and that one would best be determined by the construction of the clock movement. The pallet at the top is mounted on its own arbor 29, while at the bottom it is mounted on the pendulum staff. The pendulum staff pin 32 engages in fork 31, of the pallet arm 30.

A plate, 33 at the top of the clock movement or at the bottom of the case is used whenever necessary to provide an additional bearing for the staff and to hold the banking pins 42 which prevents excessive rotation of the pendulum. The bridge 5, may be fastened to the front or back plate 41 of the clock movement or to the clock case.

The pendulum staff may be cut off at 34 and have only one bearing provided and that in bridge 5. With only one bearing the staff pin which engages in the pallet fork or the pallet if mounted on the staff should be at the same elevation as the upper bridge elevation. The slots 35 and holes 36 in the bridge, slides and base are to be used with the right hand slots 10 and holes 9 when three suspension wires are to be used in which case guide 20 should have four arms entering four slots 21 to keep the staff centered and to cause the pendulum to rotate with the staff, and the hole in base 14 through which the staff passes should be made larger to give sufficient freedom to the staff.

It will be seen from the above specification and from the plans the great variety of constructions of my invention which still operate on the general principles. The invention is not to be limited to the specific structure shown but only by the appended claims.

I claim:

1. An oscillating rotary pendulum having a circular weight as a ring or a series of two or more equal weights, on the same level and spaced equal distances apart and at an equal distance from a common vertical axis and suspended by two or more flexible suspension cords or wires, of suitable material, which are also equal distances apart and at an equal distance from the common vertical axis of the weight or weights.

2. An oscillating rotary pendulum having one or more weights which are suspended by two or more suspension wires which are equal distances apart and at an equal distance from the common vertical axis of the weights and which has one or more braces or spanners of any convenient form to maintain the suspension wires at an equal distance from the common vertical axis during the rotation of the pendulum.

3. An oscillating rotary pendulum having one or more weights, the said weight or weights being suspended by a plurality of suspension wires, and having a vertical pendulum staff passing through the vertical axis of the weight or weights and extending above the upper points of suspension of the suspension wires and said staff not being fastened to weights or bridge except to cause the weights to turn with the staff and to prevent tipping of the weight, when only two supports are used, in a direction at right angles to a line passing through the suspension wires.

4. An oscillating rotary pendulum having a weight or weights of suitable size with, a common vertical axis, to properly control the motion of the clock, a plurality of suspension wires equal distances apart and at an equal distance from the vertical axis of the weight or weights, a vertical pendulum staff passing through the vertical axis of the weight or weights and through the necessary bearings and having a pallet mounted on said staff or having a staff pin which engages with the fork or arm of the pallet of a clock, and banking pins to prevent excessive rotation of the pendulum.

5. An oscillating rotary pendulum having a weight or weights equal distances apart and at an equal distance from a common vertical axis and fastened to a base so that the center of gyration of the total weight when rotating shall at every point be in a true circle with the center in the axis and the weight or weights being suspended by two or more suspension wires which are equal distances from the common vertical axis of the weight or weights and having adjustable slides fitting over the suspension wires at the weights to give adjustment for isochronism and near the upper end of the wires to give adjustment for rate.

6. An oscillating rotary pendulum having a weight or weights connected together by means of a bridge or base and suspended from a bridge by a plurality of suspension wires placed equal distances apart and at an equal distance from the common vertical axis of the pendulum weight or weights, a temperature compensating device consisting of posts of suitable material having a low coefficient of expansion fastened on the upper side of the base of the pendulum and to the upper ends of said posts, rods of suitable material having a high coefficient of expansion, said rods extending down below the base of the pendulum and a bridge fastened at the lower ends of the rods which is carried by the suspension wires.

7. An oscillating rotary pendulum having a weight or a plurality of equal weights which are equal distances apart and at an equal distance from a common vertical axis, the weight or weights being hung, from a bridge, on a plurality of flexible cords or wires which are at an equal distance from the vertical axis of the weight and maintained so by spanners, isochronism adjusting means, at the weight, consisting of a movable slide with slots for the suspension wires to pass through and small weights adjustable as to their vertical position, a rate adjuster consisting of an adjustable slide near the upper end of the suspension wires, the above mentioned adjustable slides being prevented from turning by guide pins which pass through holes in the slides and are mounted on adjustable thumb nuts which turn on threaded pipes which are fastened to the bridge and to the pendulum base, a temperature compensating device consisting of posts fastened to the base of the weight and extending upward therefrom and fastened at their tops are rods which extend downward and have fastened at their lower ends the lower bridge which hangs on the suspension wires, said slides, bridges, base of weight, spanners and weight are of the same material in order to insure uniform expansion under various changes of temperature, a pendulum staff extending through the weight on the line of its vertical axis to receive and transmit motion to the escapement of a clock, said staff passing through suitable bearings in which it rotates with the pendulum, and having suitable bankings to prevent excessive rotation of the pendulum.

8. An oscillating rotary pendulum in which the principles of the ordinary pendulum and of the lever are used in combination by having a weight or weights which are suspended by a plurality of suspension wires which are at an equal distance from the vertical axis of the total pendulum weight, the said suspension wires being maintained by spanners at a uniform distance from the vertical axis during the rotation of the pendulum, said parts so used as to give the following formula for determining and constructing pendulums of various sizes and rates:

$$\text{Rate} = \frac{375.66}{P\sqrt{L}}$$

In testimony whereof, I have signed my name to this specification, in the presence of two subscribing witnesses.

MORTON F. SANBORN.

Witnesses:
R. H. MANSER,
H. N. CLARKE.

Certificate of Correction.

It is hereby certified that in Letters Patent No. 1,409,242, granted March 14, 1922, upon the application of Morton F. Sanborn, of Pleasantville, New York, for an improvement in "Oscillating Rotary Pendulums," an error appears in the printed specification requiring correction as follows: Page 1, strike out line 14 and insert the same to follow line 11, present lines 12 and 13 becoming lines 13 and 14, so that the said lines 12, 13, and 14 will read as follows: *time and in which the principles of both the ordinary pendulum and the lever are used and which consists briefly of a round;* and that the said Letters Patent should be read with this correction therein that the same may conform to the record of the case in the Patent Office.

Signed and sealed this 2d day of May, A. D., 1922.

[SEAL.]

KARL FENNING,
*Acting Commissioner of Patents.*